May 12, 1970   W. J. STEPHENS   3,511,285
SOLENOID ACTUATOR

Filed May 22, 1968   2 Sheets-Sheet 1

INVENTOR.
WILLIAM J. STEPHENS
BY Morse, Altman & Oates
ATTORNEYS

May 12, 1970    W. J. STEPHENS    3,511,285
SOLENOID ACTUATOR

Filed May 22, 1968    2 Sheets-Sheet 2

INVENTOR
WILLIAM J. STEPHENS
BY
Morse, Altman & Oates
ATTORNEYS

United States Patent Office 3,511,285
Patented May 12, 1970

3,511,285
SOLENOID ACTUATOR
William J. Stephens, Bedford, Mass., assignor to Z & D Industries, Inc., Woburn, Mass., a corporation of Massachusetts
Filed May 22, 1968, Ser. No. 731,207
Int. Cl. D03d 49/56
U.S. Cl. 139—187
8 Claims

ABSTRACT OF THE DISCLOSURE

A durable solenoid actuator is provided having particular utility in operating the binder for the shuttle box of a high speed loom. A pair of cooperating pivoted arms forming a rolling link are positioned in proximity to a solenoid with a solenoid clapper mounted on one of the arms. When the solenoid is energized one arm bears against the other with the line of contact between the arms changing as the arms pivot according to the contours of the working surfaces of the arms. One of the arms is drivingly connected to the binder for the shuttle box and a high mechanical advantage is obtained by the rolling link connection. The rolling link and solenoid assembly is able to produce a force output which is different from that of a conventional solenoid actuator.

BACKGROUND OF THE INVENTION

Field of the invention

This invention relates generally to solenoid actuators and to solenoid actuators for shuttle boxes in high speed looms. More particularly, the invention is directed towards a durable solenoid actuator having a high mechanical advantage capable of a variety of predetermined force outputs. The actuator has special application in controlling the binder for the shuttle box on a high speed loom.

Description of the prior art

In co-pending application Ser. No. 634,978, filed May 1, 1967, now U.S. Pat. 3,451,438 dated June 24, 1969, entitled "High Speed Loom" and assigned to the same assignee there is disclosed a novel system for controlling a shuttle box binder by detecting the shuttle each time it enters the shuttle box. A photocell detects the shuttle and energizes a solenoid to actuate the binder. It has been found that while the system operates in a manner superior to other types of loom control systems the conventional solenoid employed was subject to relatively rapid wear requiring rather frequent servicing primarily due to failure of the bearings. Accordingly it is an object of the present invention to provide improvements in solenoid actuators and more particularly to provide an improved solenoid actuator for the shuttle box binder of a high speed loom. A further object of this invention is to provide a solenoid actuator which may be designed to produce a force output having a predetermined character which may be different from or even the reverse of the force output of a conventional solenoid.

SUMMARY OF THE INVENTION

This invention features a solenoid actuator comprising a pair of cooperating pivoted rolling link arms mounted in operative association with a solenoid and with the solenoid clapper mounted on one of the arms. The working faces of each arm is contoured in a predetermined manner so that the levering action of one arm against the other when the solenoid is energized will produce a force output according to a predetermined curve. This invention also features a novel combination solenoid actuator and loom binder control in which one of the lever arms for the solenoid actuator is drivingly connected to the shuttle box binder in a high speed loom to provide a more controlled braking action of the shuttle when it enters the shuttle box.

DESCRIPTION OF THE PREFERRED EMBODIMENT

Figure 1:
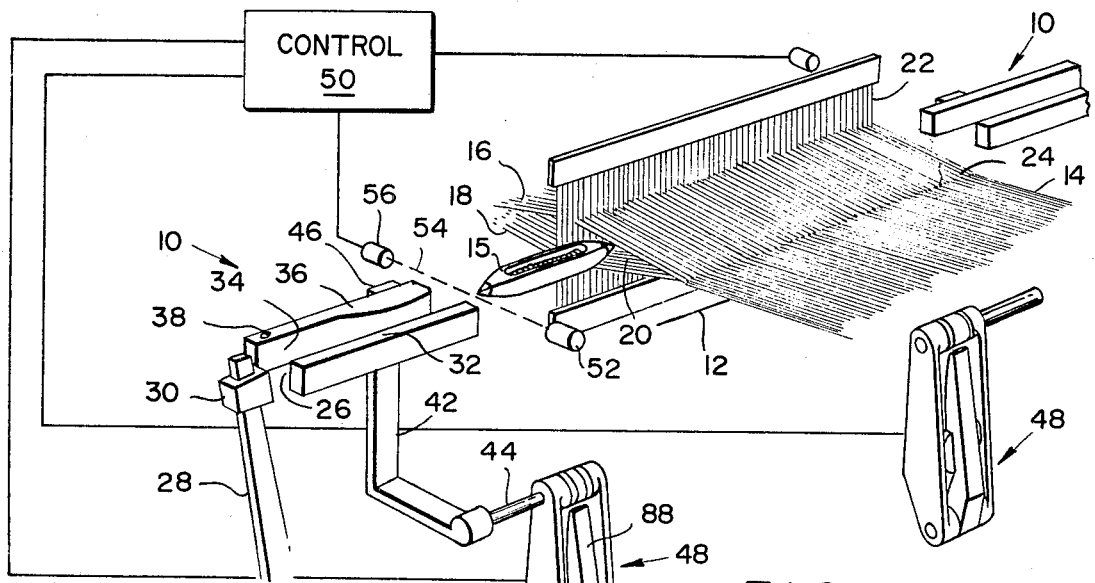
FIG. 1 is a somewhat schematic perspective view of a high speed loom binder control system made according to the invention.

In FIG. 1 a shuttle box 10 is mounted on each end of a lay 12 and for purposes of discussion only one shuttle box will be described. It will be understood that the shuttle box located on the opposite side of the lay is of similar construction and functions in the same fashion.
In FIG. 1 there is shown a portion of a woven cloth web 14 coming from the loom with warp threads 16 and 18 forming a triangular shed 20 through which a shuttle 15 is propelled. The shed is formed by reciprocating harnesses (not shown). A reed 22 is mounted on the lay 12 and cyclically advances the filling thread or pick towards the woven edge or fell 24 of the cloth 14.
The shuttle box is slotted at 26 to receive the upper end of a picker stick 28. A picker 30 is mounted on the upper end of the picker stick and is formed with a conical socket on the inner face thereof to receive the pointed end of the shuttle. The picker stick is pivoted clockwise under considerable force each time the shuttle is to be thrown into the opposite shuttle box.
The box is also provided with fixed front and rear walls 32 and 34 located on either side of the box opening. The generally rectangular opening within the box is dimensioned to accommodate the shuttle although somewhat longer than the shuttle. Associated with the fixed wall is a movable member know as the binder 36 and pivoted about a pin 38 at the end of the wall 34. The binder is provided with a working leather covered face on the opposite wall 32. The binder serves to frictionally engage the sides of the shuttle and in cooperation with the fixed wall 32 to bring the shuttle to a halt.
Movement of the binder 36 is by means of an arm 42 integral with or fixed to a control rod 44 extending parallel to the lay. The arm 42 is provided with an adjustable stop 46 which bears against the outer surface of the binder 36. The control rod 44 is pivotally mounted to the lay by suitable bearings (not shown) and is angularly deflected about its longitudinal axis by means of a novel solenoid actuator generally indicated by reference character 48. It will be understood that each time the solenoid actuator 48 is operated the rod 44 will be biased about its longitudinal axis and the arm 42 will be pivoted clockwise or to the right as viewed in FIG. 1, forcing the binder into the shuttle box.
The solenoid 48 is under the control of a shuttle detecting and positioning system which is more fully disclosed in co-pending application Ser. No. 634,978 referred to above. This system is generally indicated in box form FIG. 1 by reference character 50. The system includes a light source such as a bulb 52 producing a photobeam 54 across the shuttle box entrance against a photoelectric detecting device 56 on the opposite side of the box. Assuming the shuttle is moving in the proper fashion, it will interrupt the beam as it enters the shuttle box. This will produce a signal from the photo-electric device which in turn will initiate a time delay of very short duration after which the solenoid actuator 48 will be actuated. The time delay is sufficient to permit the shuttle to move into the box before the binder is actuated. The timing is such that the shuttle will be brought to a full stop at a predetermined, precise and repeatable position within the shuttle box without rebounding. A photo-electric sensor is located at the entrance of each shuttle box and a similar solenoid actuator 48 and associated rod, bracket and binder are employed for the opposite shuttle box.

Figure 2:
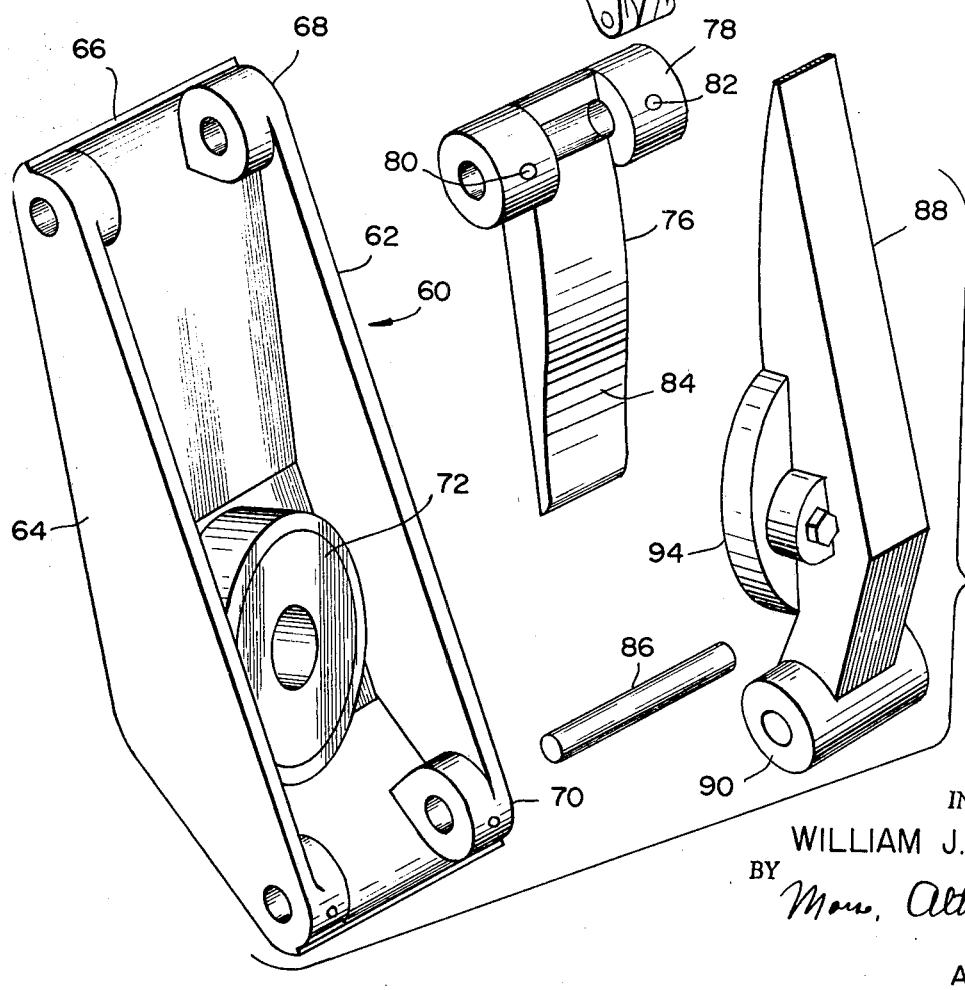
FIG. 2 is an exploded view in perspective of a solenoid actuator made according to the invention.
Figure 3:
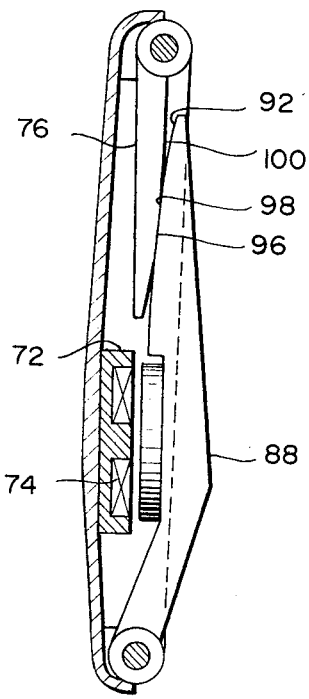
FIG. 3 is a sectional view in side elevation of the solenoid actuator, and,
FIGS. 4 and 5 are force curves.

Referring now more particularly to FIGS. 2 and 3, the solenoid actuator 48 now will be described in detail. In the illustrated embodiment the actuator comprises a rugged boxed casting 60 having side walls 62 and 64 and a rear wall 66, with integral hubs 68 and 70 formed in pairs at each end of the casting to house bronze bushings. Mounted to the lower portion of the rear wall 66 is a cylindrical core 72 for a solenoid coil 74 wound therein.

The rod 44 extends freely through the upper hubs 68 and a lever arm 76 is mounted fast to the rod 44 between the upper hubs 68. The lever arm 76 is formed with an upper hub 78 and secured to the rod 44 by means of set screws 80 and 82. The lower portion of the lever arm is formed with a relatively wide and contoured working surface 84 forming one part of a rolling linkage arrangement. The lower end of the arm 76 terminates slightly above the solenoid core 72.

Pivotally mounted in the lower hubs 70 by means of a stub shaft 86 is a second lever arm 88. The lever arm 88 is formed at its lower portion with a hub 90 and has a generally offset configuration with the upper portion being of a tapered configuration presenting a relatively wide contoured working surface 92 which cooperates with the working surface 84 of the upper lever arm in forming the rolling link arrangement. The particular contours of the working faces of the two lever arms are predetermined according to the desired operating characteristics which may vary from one application to another.

The lower lever arm 88 is somewhat longer than the upper lever arm and extends across the solenoid core 72. The lever arm 88 carries a solenoid clapper 94 having a disc-shaped configuration conforming generally in size to the solenoid core 72.

In practice, the lever arms are configured and dimensioned so that at their extreme inward positions the clapper 94 does not contact the solenoid core so as to virtually eliminate wear and shock on the solenoid components.

As shown in FIG. 3, when the solenoid is energized the clapper will be drawn towards the core thereby pivoting the lower lever arm 88 to the left or counterclockwise as viewed in FIG. 3. This will, of course, pivot the upper lever arm 76 to the left or clockwise thereby turning the rod 44 and actuating the binder at the shuttle box. As indicated by reference characters 96, 98 and 100 the points of contact between contoured working surfaces of the two lever arms will change as the lower lever arm is drawn closer and closer towards the solenoid. Initially the contact with the upper lever arm would be near its lower end or point 96, for example, and as the lower lever arm moves more to the left the line of contact will move upwardly to point 98, for example, effectively shortening the lever arm and reducing the mechanical advantage.

Figure 4:
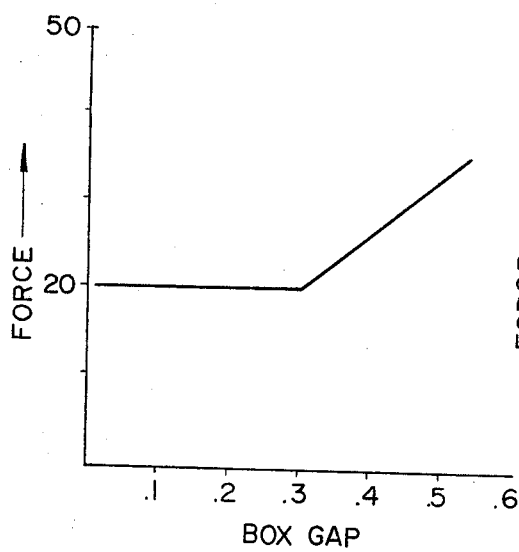
Figure 5:
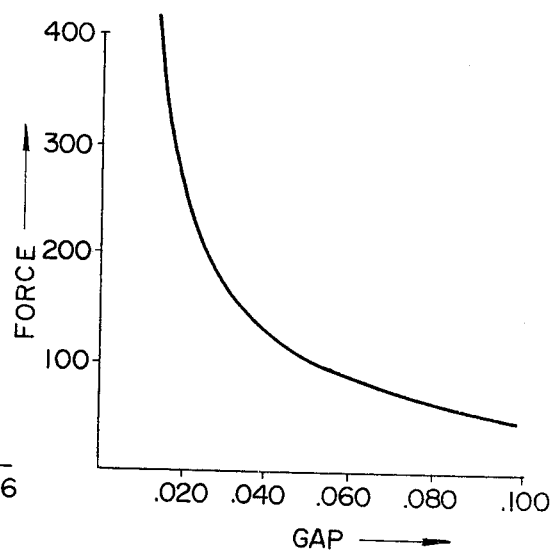

Characteristically, the force of a solenoid is lowest when its clapper gap is greatest and is at a maximum when the clapper gap is closed. Thus the output force of a solenoid alone is not constant over a full stroke which is objectionable for certain applications. With the present invention the mechanical advantage of the lever arm will be reduced as the solenoid force increases. Thus it is possible to produce a constant torque output over the full stroke of the solenoid or over a selected portion of it by combining the rolling linkage mechanism with the solenoid as disclosed herein. This is best illustrated by reference to the force curves of FIGS. 4 and 5. FIG. 5 shows the curve for a standard solenoid with gap being plotted against force. In FIG. 4 there is shown a characteristic curve of a solenoid and rolling link mechanism made according to the invention with one portion of the stroke producing a constant force and another portion producing a linear change.

Insofar as the upper and lower arms roll against each other when operating, there is very little tendency to wear and this coupled with the relatively large bearing surfaces will insure long, trouble-free life. Since the clapper never contacts the solenoid the life of the clapper and the solenoid, for all practical purposes, is indefinite.

Having thus described the invention, what I claim and desire to obtain by Letters Patent of the United States is:

1. A solenoid actuator, comprising
  (a) a support,
  (b) a pair of cooperating rolling link members pivotally mounted to said support, and,
  (c) a solenoid,
  (d) one portion of said solenoid mounted to said support and another portion mounted to one of said members whereby energization of said solenoid will pivot one member against the other member,
  (e) said members being formed with contoured working cam surfaces mutually profiled to cause a predetermined rolling change in the point of contact between said members upon pivoting thereof.

2. A solenoid actuator according to claim 1 wherein said members are in the form of elongated arms pivoted to said support about spaced parallel axes and extending into overlapping engagement.

3. A solenoid actuator according to claim 2 wherein said solenoid portions are located between said axes.

4. A solenoid actuator according to claim 2 wherein said one solenoid portion includes a coil and the other solenoid portion includes a magnetically responsive member.

5. A solenoid actuator according to claim 1 including means for preventing physical contact between said solenoid portions.

6. Apparatus for operating the binder of a loom shuttle box, comprising in combination
  (a) a rolling link mechanism including a first pivotally mounted arm operatively connected to said binder and a second pivotally mounted arm operatively engaging said first arm,
  (b) a solenoid for biasing said second arm against said first arm,
  (c) one portion of said solenoid being mounted on said second arm and another portion being mounted in relatively fixed position opposite said one portion,
  (d) said arms being formed with cooperative working surfaces contoured to define a rolling link connection whereby the point of contact between said arms will change in a predetermined manner upon pivoting thereof.

7. Apparatus according to claim 6 including a pivotal rod fixed to said first arm and engaging said binder.

8. Apparatus according to claim 6 including photoelectric means for detecting a shuttle entering said shuttle box and adapted to energize said solenoid.

(References on following page)

References Cited

UNITED STATES PATENTS

| | | | |
|---|---|---|---|
| 1,062,017 | 5/1913 | Larson | 335—276 X |
| 1,991,018 | 2/1935 | Hopewell | 139—187 |
| 2,205,900 | 6/1940 | Jones | 139—185 |
| 2,436,354 | 2/1948 | Burke et al. | 335—276 X |
| 3,124,166 | 3/1964 | Pfarrwaller | 139—185 X |

FOREIGN PATENTS

| | | |
|---|---|---|
| 561,017 | 7/1923 | France. |
| 943,838 | 6/1956 | Germany. |

JAMES KEE CHI, Primary Examiner

U.S. Cl. X.R.

139—341; 335—276